July 28, 1959  R. L. BOGAR  2,896,876
FISHING REEL WITH SPOOL CONTROL MECHANISM
Filed Dec. 8, 1955
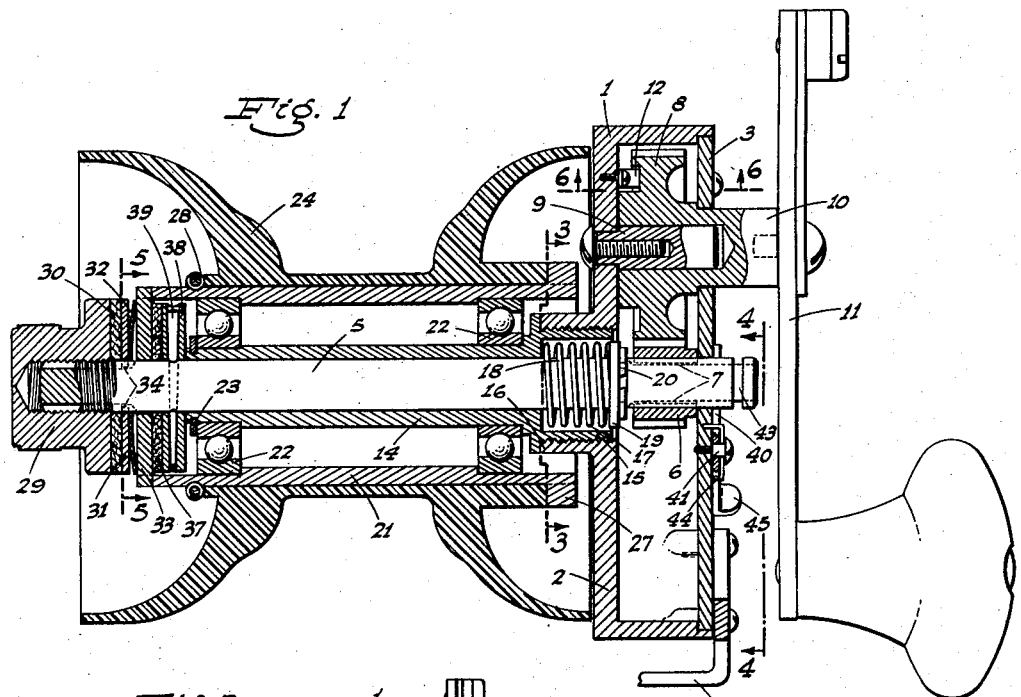
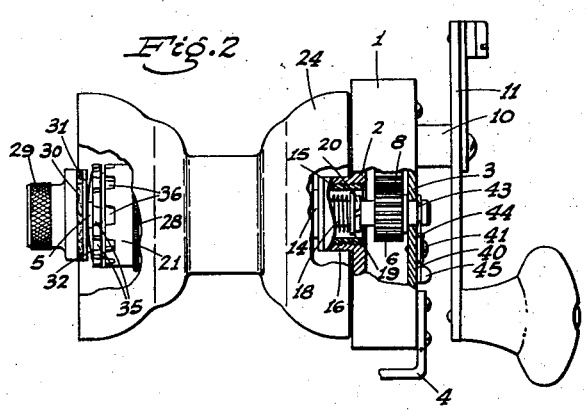
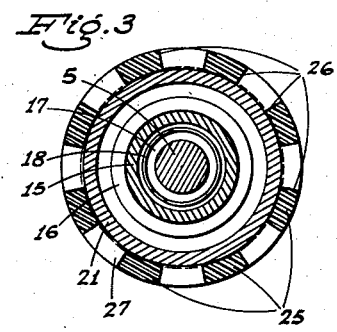
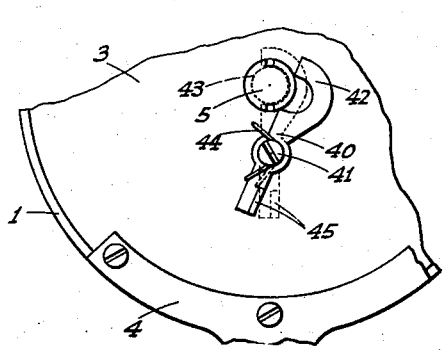
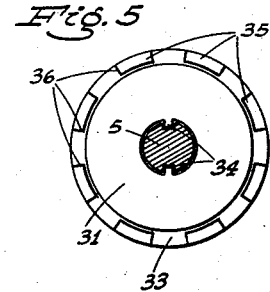
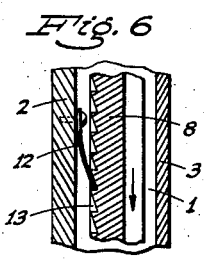
INVENTOR
Roy L. Bogar
BY Webster & Webster
ATTYS.

United States Patent Office
2,896,876
Patented July 28, 1959

2,896,876

FISHING REEL WITH SPOOL CONTROL MECHANISM

Roy L. Bogar, Stockton, Calif.

Application December 8, 1955, Serial No. 551,888

7 Claims. (Cl. 242—84.54)

This invention relates in general to an improved fishing reel; the present application being a continuation-in-part of my copending application, Serial No. 435,006, filed June 7, 1954 (now United States Patent No. 2,731,214, dated January 17, 1956).

In particular the present invention is directed to, and it is a major object to provide, a fishing reel which embodies a novel brake or drag mechanism which is operative to adjustably and yieldably resist rotation of the spool whereby when a large fish is being played, or a snag is caught as when trolling, the pull or tension on the line causes the spool to rotate and the line to pay out, so as to prevent line breakage.

Another object of this invention is to provide a fishing reel, as above, in which said brake or drag mechanism is arranged for ready and convenient manual setting to a released position whereby the spool is then freely rotatable, as for casting of the line; such brake or drag mechanism being automatically spring-returned to an operative position simply upon movement of an exposed finger member.

An additional object of this invention is to provide a fishing reel in which the spool is readily removable to permit another spool—with a different size line—to be substituted on the reel; this entirely manually and without in any way interfering with—or requiring any dismantling of—the brake or drag mechanism.

It is also an object of the invention to provide, in a fishing reel, a spool control mechanism which is designed for ease and economy of manufacture.

A still further object of the invention is to provide a practical, reliable, and durable fishing reel, with spool control mechanism, and one which will be exceedingly effective for the purpose for which it is designed.

These objects are accomplished by means of such structure and relative arrangement of parts as will fully appear by a perusal of the following specification and claims.

In the drawings:

Fig. 1 is an enlarged sectional elevation of the fishing reel showing the brake or drag mechanism in its normal or operative position.

Fig. 2 is an elevation of the reel on a reduced scale, partly broken away and partly in section; the brake or drag mechanism being shown in its released position.

Fig. 3 is a vertical transverse section on line 3—3 of Fig. 1.

Fig. 4 is a fragmentary rear end elevation of the fishing reel showing particularly the catch for the longitudinally shiftable axle.

Fig. 5 is a transverse vertical section on line 5—5 of Fig. 1.

Fig. 6 is a fragmentary horizontal section taken on line 6—6 of Fig. 1, and looking upwardly.

Referring now more particularly to the drawings, and to the characters of reference marked thereon, the reel comprises a circular housing 1 having a front plate 2 and a back plate 3; the reel being adapted to be secured in a predetermined position in connection with the reel seat of a rod by a mount, shown in part at 4, which may—for example—be of the type shown in my identified copending application.

A relatively small-diameter axle 5 extends centrally through the circular housing 1; such axle projecting a substantial distance beyond the front plate 2, and a relatively short distance beyond the back plate 3.

A pinion 6 is slidably splined, as at 7, on the axle 5 within housing 1, and such pinion is driven by a housing-enclosed gear 8 carried on an offset spindle 9. The gear 8 includes an elongated hub 10 which projects in turnable relation through the back plate 3, and outwardly of the latter said hub is fitted with a crank handle 11. The gear 8 is run in a clockwise direction by the crank handle 11, and contra-rotation is prevented by a spring pawl 12 mounted in the housing 1 and running in engagement with a circumferential ratchet 13 whose teeth face opposite the direction of rotation.

A stationary inner sleeve 14 surrounds the axle 5 beyond the front plate 2, and at its inner end said sleeve 14 is enlarged, as at 15, and is threaded into a boss 16 which projects from said front plate 2; such inner end of the sleeve being formed with an enlarged bore 17.

A compression spring 18 is disposed in the bore 17 in surrounding relation to the axle 5, and such spring is engaged at one end against the bottom of the bore 17, and at the other end against a washer 19 whose rearward displacement on said axle is prevented by a snap ring 20. The spring 18 normally urges the axle 5 rearwardly a predetermined distance; such axle being slidable in the stationary inner sleeve 14, as well as in the pinion 6.

A rotary outer sleeve 21 surrounds the stationary inner sleeve 14 in spaced relation, and is journaled on the latter by means of longitudinally spaced bearings 22 having shoulder engagement with the respective sleeves; the foremost ones of the bearings 22 being held against escape from the stationary inner sleeve 14 by a snap ring 23. With this arrangement the outer sleeve 21 is free to rotate about the stationary inner sleeve 14, but is maintained against relative axial displacement.

As shown, the rotary outer sleeve 21 is of somewhat greater length than, and projects some distance forwardly beyond, the free end of the stationary inner sleeve 14.

An initially separate spool 24, for fishing line, is removably engaged on the rotary outer sleeve 21. At the end adjacent the housing 1 the spool 24 is provided with a separable driving connection with the rotary outer sleeve 21; such connection comprising circumferentially spaced, longitudinal lugs 25 on the spool end engaging in corresponding notches 26 cut in a radially enlarged stop shoulder 27 on said sleeve 21. Separation of such driving connection, and removal of the spool 24 from the sleeve 21, is normally prevented by an endless spring type snap ring 28 which surrounds the sleeve 21 immediately beyond the free end of the spool 24; such snap ring 28 seating in a circumferential groove, as shown.

While the above arrangement normally maintains the spool 24 and sleeve 21 secured together for rotation in unitary relation, such spool can be easily removed—for replacement of another spool with a different size line—by merely disengaging the snap ring 28 and then sliding the spool 24 off the sleeve 21.

The reel includes the following novel brake or drag mechanism, and which normally prevents free running of said spool 24.

At its free end portion the axle 5 projects some distance beyond the adjacent ends of the sleeves 14 and 21, and a finger nut 29 is adjustably threaded on said end of the axle; the back face of said nut being flat and enlarged in diameter, as shown.

Axially inwardly of the adjustable finger nut 29 there is assembled—on the axle 5—first a friction washer 30 adjacent said nut, then an intermediate metallic washer 31, followed by a convexo-concavo spring washer 32 whose concave surface faces and engages a radial driving disc 33 slidable on said axle. The intermediate washer 31 is slidable on the axle 5, but is maintained against rotation by spline and key means 34.

At its periphery the radial disc 33 has a separable driving connection with the free end of the rotary outer sleeve 21, which connection comprises circumferentially spaced radial lugs 35 on said disc 33, with such lugs normally engaged in corresponding notches 36 formed in the sleeve 21.

When the radial disc 33 is in said normal position, with the lugs 35 seated in notches 36, said disc abuts, at its rear face, against another friction washer 37 on axle 5, and which washer is backed by a disc 38 fixed on said axle by a tapered pin 39.

With the spring 18 normally urging the axle to a rearward position, and upon adjustment of the finger nut 29, the described brake or drag mechanism imposes resistance to turning on the radial disc 33, and consequently upon the rotary outer sleeve 21 and the spool 24 thereon. Thus, when a large fish is being played, or a snag is encountered when trolling, such brake or drag mechanism permits the spool 24 to yieldably turn, but with a certain resistance, and with such turning the line pays out to prevent its breakage.

When it is desired that the spool 24 run free, as when casting, the fisherman pushes with a finger on the exposed rearward end of the axle 5, advancing the latter—against the compression of spring 18—a distance sufficient to release the described brake or drag mechanism at the opposite end of said axle, and at which time the driving connection between the disc 33 and the rotary outer sleeve 21 is disengaged (see Fig. 2). When the axle 5 is so advanced it is releasably maintained in such position by a catch lever 40 pivoted, as at 41, on the outside of the back plate 3 in offset relation to such axle; such catch lever 40 being formed—on its inner end—with a semi-circular or C-shaped catch 42 which drops into a circumferential groove 43 in the adjacent and exposed portion of such axle.

The catch lever 40 automatically assumes such position, when the axle 5 is manually advanced, by reason of a wire spring 44 turned intermediate its ends about the pivot 41, with one end of said spring bearing against the lever 40 and the other end anchored to the back plate 3. In other words, when the axle 5 is manually advanced, the C-shaped catch 42 snap-engages in the groove 43 to hold the axle in said advanced position, and during the time that the spool 24 is desired to run free.

Since the finger nut 29 on the forward end of the axle, and which is normally rigid with said axle, is exposed clear of the spool 24, as clearly shown in Fig. 1, the axle can obviously be advanced by a pull applied to the nut, as well as by a push applied to the rear end of the axle, as above described.

In order to permit the axle 5 to be retracted by the spring 18 to its normal position, and with the brake or drag mechanism again in operation, it is only necessary for the fisherman to finger-engage a tab 45 on the free end of the catch lever 40, pressing said tab in a direction to swing the lever 40 from its dotted-line to its full-line position of Fig. 4.

With the described fishing reel, and particularly by reason of the inclusion of the disclosed spool control mechanism, it is possible for the fisherman to quickly adjust the reel between spool braking or drag position, and a released free-spool position; this being of particular advantage when the reel is used in connection with a mount of the type shown in the aforementioned application, and wherein the reel can be set, selectively, to a position with the spool extending lengthwise of the rod for spin-type casting, and another position extending transversely of the rod during the actual fishing operation.

From the foregoing description it will be readily seen that there has been produced such a device as will substantially fulfill the objects of the invention, as set forth.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fishing reel comprising a housing, a spool projecting from the housing to a free end termination, a stationary sleeve fixed to and projecting from the housing, a rotary sleeve journaled on the stationary sleeve, the spool being engaged on the rotary sleeve, means securing the spool and rotary sleeve against relative rotation, said securing means including an axially separable driving connection between the rear end of the spool and the rotary sleeve, and a snap-ring on the latter immediately adjacent the forward end of the spool; an axle projecting from within the housing through the stationary sleeve to an outer end termination beyond the rotary sleeve, means including gearing in the housing and an external crank handle operative to rotate the axle, and a drag mechanism between the outer end of the axle and said rotary sleeve.

2. A fishing reel comprising a housing, a spool, a stationary sleeve rigid with and projecting from the front face of the housing, a rotary spool supporting sleeve turnably mounted on the stationary sleeve, the spool being non-rotatably mounted on said rotary sleeve, an axle slidably projecting through the stationary sleeve and turnably supported thereby, hand means to rotate the axle, means connecting the axle and rotary sleeve in driving relation and disengageable from said sleeve by advance of the axle a predetermined distance, one end of the axle being exposed for finger engagement whereby said axle may be so advanced, and releasable means on the housing to automatically latch the axle against retractive movement when so advanced.

3. A reel, as in claim 2, with an exposed finger-engageable element fixed on the other end of the axle whereby said axle may be so advanced by a pull on said other end thereof.

4. A fishing reel comprising a housing, a spool, a stationary sleeve rigid with and projecting from the front face of the housing, a rotary sleeve turnably mounted on the stationary sleeve and on which the spool is non-rotatably mounted, an axle slidably projecting through the stationary sleeve and turnably supported thereby, hand means to rotate the axle, a driving disc turnable on the axle at the front end of the rotary sleeve and normally engaging the same in driving engagement but releasable from such engagement upon forward movement of the axle, a friction driving connection between the back side of the disc and the axle and including a disc fixed with the axle whereby upon forward movement of the axle the driving disc will be advanced to clear the rotary sleeve; the axle projecting from the back face of the housing for pushing finger engagement.

5. A reel, as in claim 4, with releasable catch means mounted on the housing and arranged to automatically engage and hold the axle against retraction after advance thereof.

6. A reel, as in claim 4, with an adjustable finger nut on the front end of the axle, friction elements on and turnable with the axle and disposed between the nut and the front side of the disc whereby said disc is confined, with adjustable pressure, between said friction driving connection and the friction elements.

7. A reel, as in claim 4, in which the projecting portion of the axle is formed with a circumferential groove; a catch lever substantially the width of the groove mounted on the housing in a position at right angles to the axle to engage adjacent one end in said groove upon advance of the axle a distance sufficient to disengage the driving disc from the rotary sleeve, and a spring acting on the lever to urge the same into the groove and normally holding the lever in contact with the axle back of the groove.

References Cited in the file of this patent

UNITED STATES PATENTS

| | | |
|---|---|---|
| 2,136,438 | Horsrud | Nov. 15, 1938 |
| 2,209,598 | Coxe | July 30, 1940 |
| 2,298,481 | Hayes | Oct. 13, 1942 |
| 2,561,935 | McCash | July 24, 1951 |
| 2,573,240 | Berlinger | Oct. 30, 1951 |
| 2,633,307 | Morgan et al. | Mar. 31, 1953 |